United States Patent [19]

Gute

[11] 4,054,311
[45] Oct. 18, 1977

[54] ENERGY ABSORBER WITH INTERNAL PRESSURE RELIEF VALVE

[75] Inventor: Loren R. Gute, Dayton, Ohio

[73] Assignee: General Motors Corporation, Detroit, Mich.

[21] Appl. No.: 626,732

[22] Filed: Oct. 29, 1975

[51] Int. Cl.² .................... B60R 19/06; F16F 9/06
[52] U.S. Cl. ........................ 293/70; 293/85; 267/64 R; 267/116; 213/223
[58] Field of Search ............ 293/1, 70, 85, 86, 89, 293/DIG. 2; 267/64 R, 116, 139; 213/223

[56]  References Cited
U.S. PATENT DOCUMENTS

| 2,989,299 | 6/1961 | Modrich | 293/86 |
| 3,700,273 | 10/1972 | Jackson et al. | 293/89 X |
| 3,751,091 | 8/1973 | Rennecker | 293/85 X |
| 3,794,310 | 2/1974 | Mewhinney | 293/89 X |
| 3,820,772 | 6/1974 | Kerr et al. | 293/89 X |
| 3,853,311 | 12/1974 | Kreuzer et al. | 293/70 X |
| 3,891,199 | 6/1975 | Willich et al. | 267/64 R X |

Primary Examiner—Robert B. Reeves
Assistant Examiner—Charles A. Marmor
Attorney, Agent, or Firm—Charles R. White

[57]  ABSTRACT

Energy absorbing unit for vehicle bumper support having inner and outer telescoping cylinders with primary valve for metering fluid between a pair of contractible and expansible fluid chambers to dissipate impact energy. An auxiliary pressure relief valve internal of the unit in parallel with the primary valve opens in response to predetermined pressure buildup in one of the chambers to control pressure and prevent damage to the unit. A gas spring in the unit moves the two cylinders in their extended position on removal of bumper impact load.

2 Claims, 3 Drawing Figures

ENERGY ABSORBER WITH INTERNAL PRESSURE RELIEF VALVE

This invention relates to energy absorbing units having telescopically mounted inner and outer cylinders movable between extended and collapsed positions for mounting a bumper assembly to a vehicle. More particularly, this invention relates to a new and improved energy absorber unit having primary valve means for metering fluid between the chambers and an internal pressure relief valve means in parallel with the primary valve means to control pressure in the unit resulting from high speed impacts.

Prior to the present invention, hydraulic energy absorber units have been used to mount a bumper assembly to a vehicle frame or other supporting structure. Some of these units have telescoping components providing a pair of contractible and expansible fluid chambers interconnected by valve means that meters fluid therebetween when the unit is being telescoped by an impact force to absorb impact energy. In other energy absorber units a one-piece cylindrical member is provided with a blow-out plug or weakened wall portions to reduce the buildup of excessive energy in the unit in response to high speed vehicle impacts of the bumper supported by such units. This design places high forces on the vehicle until the blow-out plug ruptures and then it stops absorbing energy in high speed impacts during stroking. While these prior constructions have been satisfactory, they do not provide for improved internal pressure relief as in this invention which eliminates damage or destruction of the unit resulting from high speed impact.

It is an object of this invention to provide a new and improved energy absorber having telescoping inner and outer cylinders providing a pair of expansible and contracting chambers interconnected by first valve means to meter fluid between the chambers when the unit is collapsed on impact of a bumper supported thereby and second valve means in parallel with the first valve means to provide pressure relief of the contracting chambers in response to impact of the bumper causing a predetermined buildup in pressure in the contracting chamber.

Another object, feature and advantage of this invention is to provide a new and improved telescoping energy absorber unit having a pair of valve means interconnecting a pair of variable volume chambers filled with oil and operative in response to buildup of a predetermined pressure in the unit to control oil flow between the chambers and dissipate impact energy and to further provide a pressure relief device by having one of the valves opening in response to a buildup of a pressure in one of the chambers above a predetermined pressure.

Another object, feature and advantage of this invention is to provide a new and improved energy absorbing unit having a pair of telescoping cylinders providing a pair of variable volume fluid chambers hydraulically interconnected by a pair of valve means in parallel with each other which operate in conjunction with each other to meter fluid between the chambers to dissipate impact energy, one of the valve means being a spring loaded disc member providing a quick opening device responsive to predetermined impact to relieve pressure and thereby prevent destruction of the unit. This construction keeps the energy absorber active by absorbing energy throughout the stroke.

These and other features, objects and advantages of this invention will become more apparent from the following detailed description and drawings.

Figure 1:
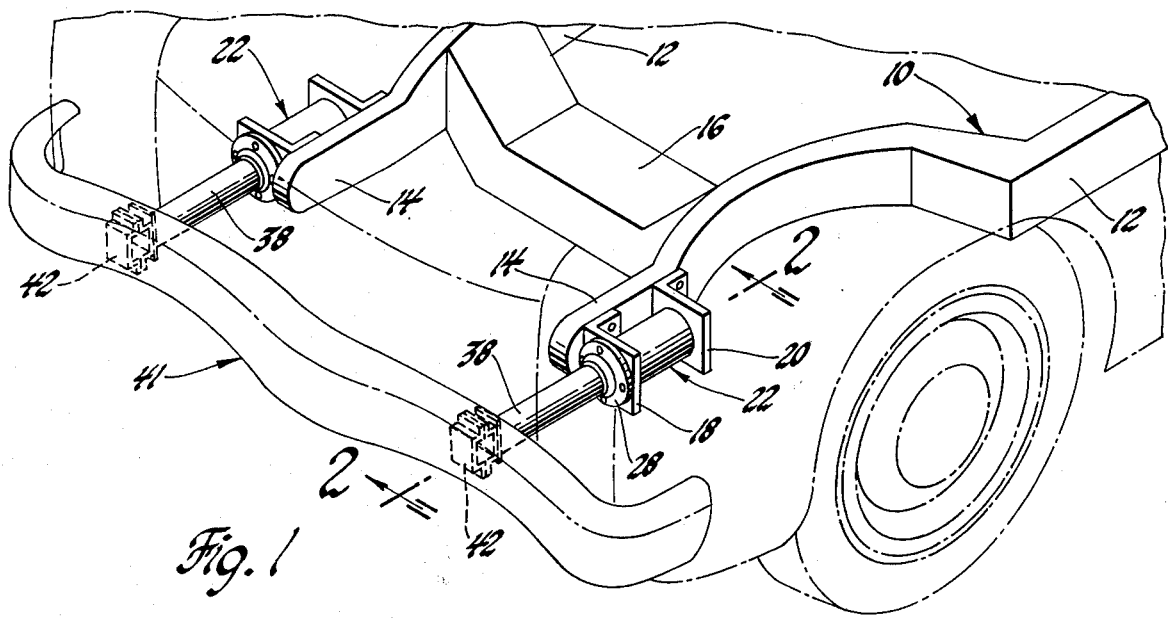
FIG. 1 is a perspective view of a vehicle chassis frame and energy absorber units mounting a bumper assembly to the frame.

Referring now in particular to FIG. 1 of the drawings, there is a vehicle chassis frame 10 comprising a pair of laterally spaced side rails 12 having forwardly extending horn portions 14 interconnected by a front cross member 16. Bolted to each horn portion 14 are front and rear L-shaped brackets 18 and 20 that are longitudinally spaced from each other which connect identical left and right energy absorbing units 22 to the chassis frame 10. Each energy absorber unit 22 extends through a circular opening in its associated front or outermost bracket 18 and has an outer cylinder 24 welded at 26 to a collar 28. The collar 28 is in turn bolted or otherwise rigidly secured to the front bracket 18. The outer cylinder 24 is closed at one end by a circular end cap 30 welded or otherwise secured thereto. A threaded stud 32 rigidly fixed to cap 30 and projecting axially therefrom extends through an opening 34 in bracket 20. Nut 36 threaded onto stud 32 rigidly secures the end cap 30 and thus the outer cylinder 24 to the bracket 20. In addition to the outer cylinder 24 each energy absorber unit 22 comprises an inner cylinder 38 that is mounted for limited telescoping movement within cylinder 24 and which projects forwardly therefrom. The forward end of the inner cylinder 38 is closed by a base plate 40 welded thereto which is adapted to be secured to a bumper assembly 41 by suitable connector means 42. Secured to the inner or rearward end of the inner cylinder 36 is a cylinder cap 44 that separates the interior of the cylinders into intermediate and rear fluid chambers 46 and 48 each of which is filled with a suitable hydraulic fluid such as oil. A thin wall cylindrical cap sleeve 50 made of suitable material such as glass-filled Nylon is mounted over the cylinder cap 44 to slidably fit the inner diameter of the outer cylinder 24. There is, however, sufficient clearance between the cap sleeve 50 and the inner wall of cylinder 24 allowing the direct communication of chamber 48 with an inner space 51 formed between the inner and outer cylinders. The forward end of this inner space is sealed by a resilient cylindrical sleeve 52 made of Teflon, Nylon or other suitable material disposed between cylinders 24 and 38 and carried by a stop sleeve 53. Stop sleeve 53 is a metallic cylindrical member closely fitting and secured to cylinder 38.

Mounted in the inner cylinder 38 is a floating sheet metal piston 54 fitted with an O-ring 56 that separates the intermediate chamber 46 from a front chamber 58 formed between the floating piston and base plate 40. A quantity of gas is compressed in chamber 58 which is injected through an orifice 60 formed in the base plate and is subsequently trapped in chamber 58 by a ball 62 welded in orifice 60. The force of gas compressed within chamber 58 urges the cylinders 38 and 24 to the normally extended position shown in FIGS. 1 and 2. The stop sleeve 53 is rigidly secured to cylinder 38 and has a tapered head 63 that contacts the inwardly crimped end 65 of cylinder 24 to limit the outward movement of cylinder 38 relative to cylinder 24. The stop sleeve 53 extends rearwardly to support the resilient sealing sleeve 52. This sleeve in addition to providing for fluid sealing also functions as a rebound control device when the unit moves from a telescoped toward a fully extended position as fully described in U.S. Pat. No. 3,889,994 issued June 17, 1975 to Ralph W. Edwards.

The cap sleeve 50 has an outer peripheral portion hooked around the said circumferential outer edge of cap 44 and has an inner peripheral portion extending radially inwardly to partially cover the front face of the cap 44.

Figure 2:
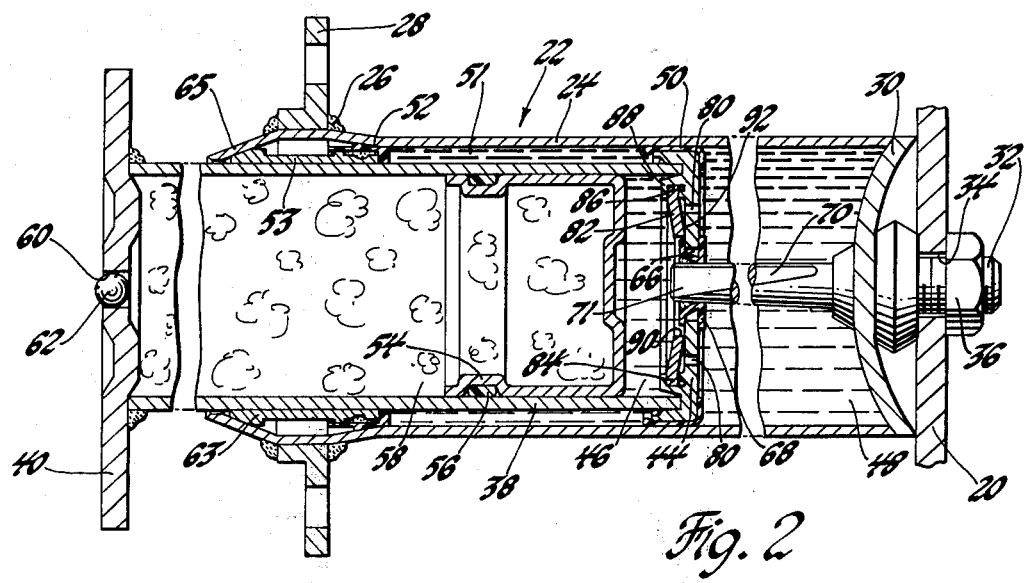
FIG. 2 is an enlarged cross sectional view taken generally along the plane indicated by lines 2—2 of FIG. 1.

As shown, cap 44 is formed with a centralized circular aperture 66. Movably mounted with respect to the aperture is a ring-like orifice element 68 that has outwardly extending radial flanges that embrace the opposite edges of the cylinder cap 44 immediately surrounding aperture 66 as best shown in FIG. 2. The orifice element is sized so that it may float or radially slide relative to the aperture 66.

An elongated metering rod 70 welded to cap 30 extends axially in the energy absorbing unit 22 and projects through the orifice elements 68. As will be further described below the metering rod and orifice element cooperate to provide a progressively decreasing orifice area for metering fluid between chambers 48 and 46 as the unit 22 is stroked by an impact load. The rod 70 is preferably formed with three equally spaced flats 71 disposed at various angles with respect to the rod centerline over the length of the latter to exhibit varying depths relative to the cylindrical dimension of the rod. The rod is otherwise sized closely to the inner diameter of the orifice element 68 so that the orifice element is guided by the curved portions of the metering rod as the unit strokes. For example during an energy absorbing operation with impact forces telescoping the cylinder 38 inwardly, any slight axial misalignment between the metering rod 70 and aperture 66 is accommodated by the limited amount of radial floating or sliding movement of orifice element 68 as permitted by its radial clearance from the edge of aperture 66.

The flats 71 of the metering rod provide for a gradually decreasing orifice area between the rod and the inner edge of the orifice element when the inner cylinder is stroked into the outer cylinder by impact forces applied to the bumper assembly. With this construction, a substantially constant pressure is maintained in the chamber 48 as it contracts and as the fluid is metered therefrom into the intermediate chamber 46 which expands. When this occurs, the floating piston 54 moves forwardly to further compress the gas in chamber 58 which provides a spring force to subsequently extend the energy absorbing unit to the fully extended position illustrated in FIG. 1. The displacement of the fluid between the chambers on impact dissipates the impact energy as more fully described in U.S. Pat. No. 3,700,273 issued Oct. 24, 1972 to George W. Jackson et al. When the impact load is removed, the compressed gas within the gas chamber 58 acts as a spring and exerts a spring force on the oil in the intermediate chamber 46 and forces it into the rear chamber 48. Thus, the intermediate chamber 46 contracts while the rear chamber 48 expands during extension or rebound of the energy absorbing unit 22 to its original position.

Figure 3:
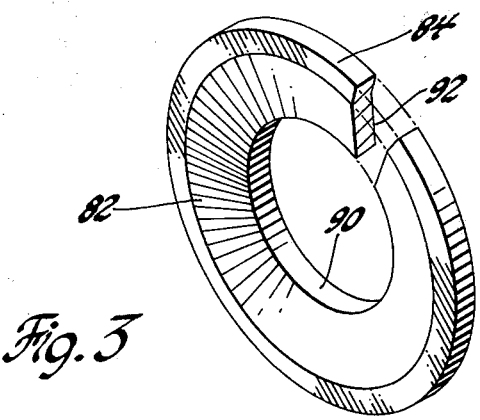
FIG. 3 is a perspective view of the valve element of the energy absorber unit of FIG. 2.

This invention provides for internal pressure relief of the energy absorbing unit on high speed impacts to minimize possible damage to the unit and vehicle. Additionally, energy absorption occurs during the entire stroke. As best shown in FIG. 2, the cylinder cap 44 is formed with a plurality of axial passages 80 surrounding the floating orifice element 68 that, under certain circumstances, provide for hydraulic communication between chambers 46 and 48. Normally, however, the passages 80 are blocked by cone-like valve member 82 so that fluid cannot flow therethrough and does not affect normal energy absorption with the metering pin. As best shown in FIG. 3, the valve member 82 is a Belleville spring and has an outer annular periphery or base 84 which is secured to the inner side of the cap 44 between an annular shoulder 86 and crimped over portions 88 of the cap 44. The circular inner periphery or apex 90 of the valve 82 surrounds the orifice element 68 as shown in FIG. 2 and is spaced therefrom to allow the radial movement of the orifice element during an energy absorbing stroke of the unit. The inner face 92 of the valve element 82 adjacent to inner periphery 90 normally contacts the face of the cap to effectively seal the passages 80 from hydraulic communication with the intermediate chamber 46.

On high speed impacts of the bumper assembly 41, such as a 25 mph impact, a high pressure buildup will occur in chamber 48 as fluid is metered through the orifice element 68 into chamber 46. At a predetermined pressure in chamber 48 the valve member 82 will axially flex so that the inner sealing face 92 of the valve element 82 moves out of contact with the inner face of the cylinder cap 44. Under these circumstances the hydraulic fluid in chamber 48 can flow through the passages 80 into chamber 46 to relieve the pressure buildup in chamber 46. This permits the inner cylinder to fully telescope inwardly without excessive pressure buildup and resultant damage to the unit and to absorb additional energy. With the flow from chamber 48 flowing through the orifice element and simultaneously through passages 80 during the telescoping of the unit, there is maximized energy dissipation. After the pressure in chamber 48 is relieved, the valve element 82 springs back to its closed position, shown in FIG. 2, to close passages 80 while the compressed gas in chamber 58 acting through piston 54 forces hydraulic fluid from contracting chamber 46 back into expanding chamber 48 through the orifice element to thereby move the energy absorbing unit back to its extended position.

The amount or degree of opening of the valve element 82 to modulate the pressure in the energy absorbing unit is proportional to and dependent on the vehicle impact speed. For example the valve element 82 may be designed to fully open in response to a 30 mph impact and to open by progressively decreasing amounts in correspondence with progressively decreased impact speeds to modulate the pressure in the unit. Additionally it will be understood the valve element is capable of opening at low impact speed as the energy absorbing unit strokes and flow through the orifice element is substantially reduced or cut off by the metering rod so that the unit is active in absorbing impact energy throughout the entire stroke.

It will be appreciated that this invention provides an auxiliary valving mechanism in parallel with the primary valving mechanism formed from the floating orifice element and metering pin and which operates only when needed to relieve a high buildup of pressure in the rear chamber of the unit. Once the pressure is relieved, the auxiliary valving mechanism closes down so that the metering of the fluid is entirely through the progressively restrictive orifice element during the stroking of the unit.

While the invention has been described in connection with a preferred specific embodiment thereof, it will be appreciated that various modifications of this construction can be made in light of this description and without departing from the spirit of the disclosure or the scope of the following claims:

I claim:

1. An impact energy absorbing unit mounting a bumper assembly to a support on an automotive vehicle comprising first and second cylinders, support means mounting said first cylinder for telescoping movement with respect to said second cylinder between an extended position and a retracted position, said first and second cylinders having cooperating stop means to establish the extended position of said cylinders, said first cylinder having cap means at one end thereof slidably disposed in said second cylinder to provide variable volume first and second fluid chambers in said energy absorbing unit, a hydraulic fluid in said first and second chambers, fluid flow control means for controlling the flow of fluid from said first chamber into said second chamber in response to the telescopic movement of said cylinders to said retracted position, said fluid flow control means comprising separate first and second valve means in parallel with each other for controlling fluid flow through said cap means between said chambers as said cylinders are moved toward said retracted position to dissipate energy of an impact load applied to said bumper assembly, said first valve means comprising a centralized orifice in said cap means and cooperating restriction means to progressively restrict said orifice for hydraulically connecting said chambers in response to any impact relatively moving said cylinders toward said retracted position, said second valve means comprising a plurality of auxiliary fluid passages through said cap means surrounding said centralized orifice and hydraulically interconnecting said chambers and an annular valve spring means concentric with said centralized orifice for controlling fluid flow through said auxiliary fluid passages, fastener means integral with said cap means for securing the outer periphery of said valve spring means to said cap means, said valve spring means being a one-piece conical spring having a central opening surrounding said centralized orifice of said first valve means and having an inner annular contact face adjacent to said central opening that normally engages the inner face of said cap means to effectively seal and close said auxiliary fluid passages from transmitting fluid between said first and second chambers until a predetermined pressure is built up in said first chamber to deflect said valve spring and move said contact face from the inner face of said cap to thereby open said auxiliary passages to provide for internal pressure relief of said unit, and return spring means for moving said cylinders to said extended position as said conical valve closes said auxiliary fluid passages and in response to removal of said impact load that forces fluid from said second chamber to said first chamber through the restriction means provided by said first valve means which controls movement of said cylinders to said extended position.

2. An impact energy absorbing unit mounting a bumper assembly to a support on an automotive vehicle comprising first and second cylinders, means mounting said first cylinder for telescoping movement with respect to said second cylinder between an extended position and a retracted position, said first and second cylinders having cooperating stop means to limit the movement of said cylinders to said extended position, cap means fixed to one end of said first cylinder and slidably disposed in said second cylinder to provide variable volume first and second fluid chambers in said energy absorbing unit, a hydraulic fluid in said first and second chambers, fluid flow control means for controlling the flow of fluid from said first chamber into said second chamber in response to the telescopic movement of said cylinders to said retracted position, said fluid flow control means comprising separate first and second valve means in parallel with each other for controlling fluid flow through said cap means between said chambers as said cylinders are moved toward said retracted position to dissipate energy of an impact load applied to said bumper assembly, said first valve means comprising a metering rod and a cooperating orifice in said cap means receiving said rod, said rod and said orifice coacting to meter fluid from said first chamber to said second chamber as said cylinders telescope with respect to each other, said second valve means comprising a one-piece conical valve spring having a central opening surrounding said orifice and having an inner annular contact sealing face adjacent said central opening, a plurality of fluid passages disposed equally radially outwardly of said orifice and extending through said cap means, said passages being normally hydraulically closed by said inner sealing face of said valve spring contacting an inner surface of said cap means adjacent to said orifice, attachment means formed by upset portions of said cap means for operatively connecting the outer periphery of said valve spring to said cap means permitting said annular valve spring to axially deflect in response to a predetermined pressure buildup in said first chamber to simultaneously open said passages and allow fluid to flow from said first chamber to said second chamber and thereby reduce the pressure in said first chamber as said cylinders telescope toward said retracted position, and return spring means entirely within one of said cylinders for subsequently moving said cylinders to said extended position in response to the removal of said impact load from said bumper assembly with said conical valve spring blocking flow through said plurality of fluid passages.

* * * * *